Feb. 3, 1959     F. T. SNYDER     2,871,761
AUTOMOBILE SAFETY MIRROR
Filed Jan. 2, 1957
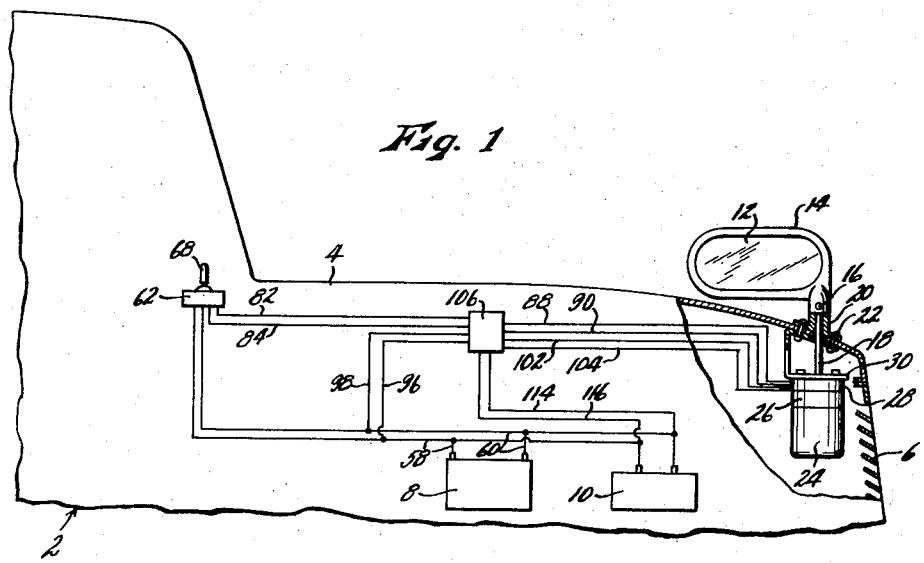
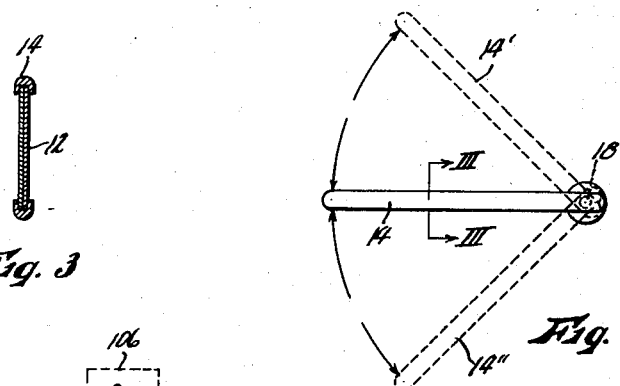
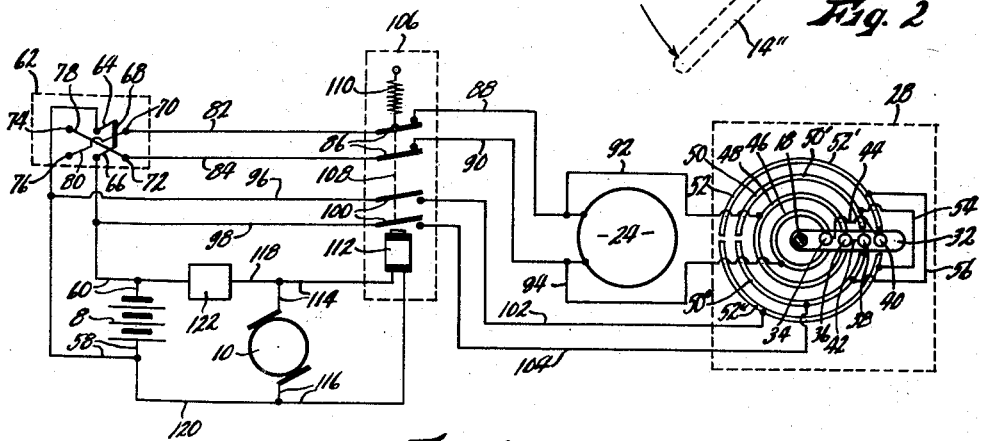
INVENTOR
Frank T. Snyder
BY John A. Hamilton
Attorney.

United States Patent Office 2,871,761
Patented Feb. 3, 1959

2,871,761

AUTOMOBILE SAFETY MIRROR

Frank T. Snyder, Kansas City, Mo.

Application January 2, 1957, Serial No. 632,157

4 Claims. (Cl. 88—86)

This invention relates to new and useful improvements in automobile safety mirrors, and has particular reference to a mirror adapted to be mounted at the forward end of the hood portion of an automobile, so that when the automobile approaches an intersection, the driver will be provided with a view along the cross street before his car has advanced sufficiently far that he could obtain a direct view of the cross street. The mirror is of course intended primarily for use at so-called "blind" corners, where the view is obstructed by buildings, trees, shrubs or the like to such an extent that a driver approaching the intersection cannot obtain direct view of the cross street until his own car has advanced so far into the intersection as to be subject to danger from any car approaching along the cross street.

The principal object of the present invention is the provision of a safety mirror of the class described which is double-faced and which is normally disposed in a neutral position parallel to the direction of travel of the automobile, whereby to present the least possible area to wind resistance, and the least possible obstruction to the driver's normal field of vision, but which may be pivoted in either direction about a vertical axis, to any desired degree, in order to provide a view in either direction along the cross street.

Another object is the provision of a safety mirror of the class described wherein the mirror movement is controlled by an electric motor which is energized by operation of an electric switch positioned conveniently to the driver.

A further object is the provision of a safety mirror of the class described which may be turned as desired and will remain at any adjusted position so long as the car is stopped or nearly stopped, as when the engine is idling, but which will return automatically to its neutral position whenever the engine is speeded up, as when again placing the car in motion. It will of course be understood that blind corners where the subject mirror is intended for use are such that good safety practice requires an approaching motorist to stop or nearly stop before proceeding into the intersection.

Other objects are simplicity and economy of construction, convenience, dependability and safety of operation, and adaptability for use with nearly any pre-existing type of automotive vehicle.

With these objects in view, as well as other objects which will appear in the course of the specification, reference will be had to the drawing, wherein:

Fig. 1 is a fragmentary side elevational view of an automobile, showing a safety mirror embodying the present invention mounted operatively thereon, the electrical control system of said mirror being shown schematically.

Fig. 2 is an enlarged top plan view of the mirror as shown in Fig. 1, showing the mirror in its neutral position in solid lines, and in representative operative positions in dotted lines, Fig. 3 is a sectional view taken on line III—III of Fig. 2, and Fig. 4 is a complete wiring diagram of the electrical control system for the mirror.

Like reference numerals apply to similar parts throughout the several views, and the numeral 2 applies generally to an automobile having the usual hood 4, grill 6, electric storage battery 8, and electric generator 10, the latter customarily being driven by the automobile engine, as clearly understood in the art.

The safety mirror 12 is planar and is double-faced, being disposed at the forward end of hood 4, in the position of the usual hood ornament. Said mirror is disposed in a vertical plane, being mounted in a suitable frame 14 so that both faces thereof are exposed. Said frame is affixed at its forward end, by means of set screw 16, to the upper end of a vertical drive shaft 18. Said drive shaft is journalled in a bearing member 20 secured to hood 4 by rivets 22. Said drive shaft is driven by an electric motor 24 through a geared speed reduction unit 26. Said shaft also extends through a switch housing 28. It will be seen that motor 24, speed reducer 26 and switch housing 28 are connected to form a unitary structure which is mounted on a bracket 30 affixed to hood 4 by rivets 22. Speed reducer 26 is preferably of the self-locking type, that is, wind or manual force applied to mirror 12 or shaft 18 cannot cause rotation of the rotor of the motor.

The reversing electrical switch carried in housing 28 is shown diagrammatically in Fig. 4, and includes an insulating arm 32 affixed to shaft 18 and extending radially therefrom, and having four contact buttons 34, 36, 38 and 40 affixed thereto, buttons 36 and 38 being interconnected by wire 42, and buttons 34 and 40 being interconnected by wire 44. As shaft 18 is turned, said contact buttons move slidably and respectively along a series of four concentric contact rings 46, 48, 50 and 52 which are insulated from each other. Rings 46 and 48 are full circles, while rings 50 and 52 are each split diametrically into two semi-circular sectors insulated from each other. The sectors of ring 50 are designated 50' and 50", while the sectors of ring 52 are designated 52' and 52". Ring sectors 50' and 52" are interconnected by wire 54, and sectors 50" and 52' are interconnected by wire 56.

The terminals of battery 8 are connected by wires 58 and 60 to the center contacts of a double-pole, double-throw reversing switch 62 disposed in a position convenient to the driver of the car, said center contacts being connected respectively to switch poles 64 and 66, which are movable by means of switch handle 68. Said switch has a pair of fixed contacts 70 and 72 which are engaged respectively by poles 64 and 66 when handle 68 is swung in one direction, and a second pair of contacts 74 and 76 which are engaged respectively by poles 64 and 66 when handle 68 is swung in the opposite direction. It will be understood also that handle 68 has a neutral position wherein poles 64 and 66 do not engage either set of fixed contacts, and that said handle remains normally in said neutral position unless manually pivoted. Fixed contacts 74 and 72 are interconnected by wire 78, and contacts 76 and 70 are interconnected by wire 80.

Fixed contacts 70 and 72 of switch 62 are respectively connected by wires 82 and 84 to the armatures of a double-pole relay 86, the fixed contacts of said relay being connected respectively by wires 88 and 90 to the terminals of motor 24. Wire 88 is connected by wire 92 to ring contact 48 of switch 32, and wire 90 is connected by wire 94 to ring contact 46 of said switch. It will be understood that motor 24 is of a type which may be reversed simply by reversing the polarity of the current supplied thereto.

Battery lead wires 58 and 60 are respectively connected by wires 96 and 98 to the armatures of a second double-pole relay 100, the fixed contacts of said relay being connected respectively by wires 102 and 104 to contact ring sectors 52" and 50" of switch 32. Relays 86 and 100 are enclosed in a suitable housing 106 which may be mounted at any suitable position in the passenger compartment or engine compartment of the automobile, or which could be mounted in a unitary housing with motor 24 if desired. Relay 86 is normally closed and relay 100 is normally open, and the relays are interlocked by a suitable link indicated at 108 so as to operate simultaneously. They are held yieldably in their respectively normally closed and normally open positions by a spring 110, and are movable to respectively open and closed positions by a single electromagnet 112. The lead wires 114 and 116 of said magnet are connected respectively to the terminals of generator 10, said generator also being connected to the terminals of battery 8 by wires 118 and 120, the usual voltage regulator 122 being interposed in wire 122.

As previously stated, generator 10 is driven by the automobile engine, the speed and voltage output thereof hence depending on the speed of said engine. The operating characteristics of magnet 112 are such that when the engine is idling, the voltage supplied to the magnet by generator 10 will not be sufficient to develop a magnetic field strong enough to operate relays 86 and 100. If the engine is operated a slightly greater than idling speed, however, or at any speed still greater, the voltage to magnet 112 will be sufficiently great to cause relays 86 and 100 to be actuated.

The operation of the device is substantially as follows: Assuming first that the automobile is idling and mirror 12 is at its neutral position as shown in solid lines in Fig. 2, it will be seen that relay 86 will be closed and relay 100 open, as shown. Also, switch 32 will be open, since contact buttons 38 and 40 thereof do not engage either contact ring 50 or 52, being disposed between the ends of the sectors of said rings, as shown. The driver then closes switch 62 in either direction desired, say to the right as shown in Fig. 4. This completes a circuit from battery 8 through wire 60, switch pole 66, contact 72, wire 84, relay 86, wire 90, motor 24, wire 88, relay 86, contact 70, switch pole 64 and wire 58 to the battery. This energizes the motor, and causes it to turn shaft 18, and hence mirror 12, in one direction, say in a clockwise direction as viewed in Fig. 4, or toward position 14' as indicated in Fig. 2. Switch 62 is held closed until the mirror is at the angle desired, whereupon switch 62 is released and returns to its neutral position. The mirror then remains at the set angle until returned to neutral as described below. It will be obvious that if switch 62 is closed to the left, the polarity of the current supplied to motor 24, and hence the direction of rotation thereof, will be reversed, the motor circuit then being from battery 8 through wire 60, switch pole 66, contact 76, wires 80 and 82, relay 86, wire 88, motor 24, wire 90, relay 86, wires 84 and 78, contact 74, switch pole 64 and wire 58 to the battery. The rotation of motor shaft 18 will then be counterclockwise.

Rotation of shaft 18 in a clockwise direction will close switch 32 on ring sectors 50" and 52", and counterclockwise rotation of the shaft will close switch 32 on ring sectors 50' and 52'. However, the centering circuit of which switch 32 is a part is controlled by relay 100, and since relay 100 is at this time open, the circuit is inoperative.

When the driver steps on the gas to start the car again in motion, the generator 10 is driven at a greater speed, and hence furnishes sufficient voltage to actuate relay magnet 112 to open relay 86 and close relay 100. Assuming that shaft 18 has been previously turned in a clockwise direction, the closure of relay 100 establishes a circuit from battery 8 through wires 60 and 98, relay 100, wire 104, ring sector 50", contact button 38, wire 42, contact button 36, ring 48, wires 92 and 88, motor 24, wires 90 and 94, ring 46, contact button 34, wire 44, button 40, ring sector 52", wire 102, relay 100, and wires 96 and 58 to the battery. The motor is thus energized to turn shaft 18 in a counterclockwise direction. This motion will continue, so long as relay 100 is closed, until switch 32 is disposed between the sectors of rings 50 and 52, switch 32 then being opened and the system being at rest. The neutral position of mirror 12 of course corresponds to the "off" position of switch 32. If shaft 18 had originally been turned in a counterclockwise direction and switch 32 thus closed on ring sectors 50' and 52'. The centering circuit would be from battery 8 through wires 60 and 98, relay 100, wire 104, ring sector 50", wire 56, ring sector 52', button 40, wire 44, button 34, ring 46, wires 94 and 90, motor 24, wires 88 and 92, ring 48, button 36, wire 42, button 38, ring sector 50', wire 54, ring sector 52", wire 102, relay 100, and wires 96 and 58 to the battery, thereby energizing motor 24 to turn shaft 18 in a clockwise direction.

Thus it will be seen that a safety mirror having several advantages has been produced. The driver is provided with a view in either direction along the cross street at a blind corner, before his car has advanced so far into the intersection as to be endangered by any vehicle on the cross street. The angle of the mirror may be adjusted rapidly and easily as desired. The mirror has a neutral position wherein it presents a minimum obstruction to normal vision, and minimum wind resistance, and can therefore be of quite substantial area to provide a wide field of vision. The mirror could also be formed with convex reflecting surfaces so as to increase the field of vision still further, but this is generally considered undesirable since the distortion of images provided by a non-planar mirror may be dangerously deceptive to the driver. The mirror cannot be turned from its neutral position as long as the car is being driven at any appreciable speed, at which time any turning of the mirror might cause undue obstruction of normal forward vision. This result stems from the fact that switch 62 is inoperative to energize motor 24 so long as relay 86 is open. The mirror returns automatically to its neutral position after use, whenever the automobile engine speed is increased to set the automobile in motion. This is an important feature of safety and convenience, since it relieves the driver from any necessity of operating switch 62 as he sets his car in motion. His full attention to driving is necessary at this time, and any diversion of his mind and hands to operate the switch could be dangerous.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. An automobile safety mirror comprising a double faced mirror, means adapting said mirror to be mounted in a substantially vertical plane at the forward end portion of an automobile, and to be pivotable about a vertical axis, manually actuated means operable to turn said mirror about said vertical axis in either direction from a neutral position in which it is disposed substantially parallel to the direction of travel of said automobile, and means actuated automatically responsively to operation of the engine of said automobile at or above a predetermined speed, said automatic means being operable when actuated to return said mirror to its neutral position.

2. An automobile safety mirror as recited in claim 1 wherein said automatic means, when actuated, is operable also to render said manually actuated means inoperative.

3. An automobile safety mirror comprising a double faced mirror, means adapting said mirror to be mounted in a substantially vertical plane at the forward end portion of an automobile, and to be pivotable about a vertical axis; a reversible electric motor operable to turn said mirror about said vertical axis in either direction from a neutral position in which it is disposed substantially parallel to the direction of travel of said automobile; a primary electrical circuit including a power source, said motor, a normally open reversing switch accessible to the driver of the automobile and manually closable to cause rotation of said motor selectively in either direction, and a normally closed relay; a centering electrical circuit including said power source, said motor, a normally open relay, and a reversing switch connected to and movable with said mirror, said switch having an open position corresponding to the neutral position of said mirror and being operable by rotation of said mirror in either direction from its neutral position to be closed to condition said centering circuit to cause operation of said motor to turn said mirror in an opposite direction when said normally open relay is closed; and means operable automatically in response to operation of the engine of said automobile at or above a predetermined speed to cause simultaneous opening of said normally closed relay, and closing of said normally open relay.

4. An automobile safety mirror as recited in claim 3 for use in an automobile equipped with an electrical generator driven by the automobile engine, the voltage output of said generator increasing with the speed of said engine, and wherein said last named automatic means comprises an electromagnet the leads of which are connected to the terminals of said generator, the voltage required by said electromagnet to actuate said relays being greater than the voltage supplied by said generator at idling speed of said engine.

References Cited in the file of this patent

UNITED STATES PATENTS 2,607,273  Lark _____ Aug. 19, 1952

FOREIGN PATENTS 487,628  Germany _____ Dec. 11, 1929